United States Patent

[11] 3,614,056

| [72] | Inventor | William Alvarez<br>Placentia, Calif. |
|---|---|---|
| [21] | Appl. No. | 10,780 |
| [22] | Filed | Feb. 12, 1970 |
| [45] | Patented | Oct. 19, 1971 |
| [73] | Assignee | Jonathan Manufacturing Company<br>Fullerton, Calif. |

[54] FLUSH BOTTOM TANK BALL VALVE
31 Claims, 5 Drawing Figs.

| [52] | U.S. Cl. | 251/144,<br>251/148, 251/172, 251/214, 251/317 |
|---|---|---|
| [51] | Int. Cl. | F16k 5/02 |
| [50] | Field of Search | 251/144,<br>148, 172, 317, 214 |

[56] References Cited
UNITED STATES PATENTS

| 2,858,098 | 10/1958 | Sanctuary | 251/317 X |
|---|---|---|---|
| 3,367,628 | 2/1968 | Piel | 251/144 |
| 3,442,490 | 5/1969 | Smith | 251/317 |

Primary Examiner—Harold W. Weakley
Attorney—Paul A. Weilein

ABSTRACT: A valve body with coaxial inflow and outflow ports confines under pressure a plastic cage and a ball element having a diametrical passage therethrough rotates in the cage. Fluid pressure at the inflow port additionally pressurizes the cage and the sealing pressure of the cage is concentrated in two annular zones near the two ports. A radial operating stem is journaled in plastic seals that are pressurized by a nut on the stem. A valve handle which normally interlocks the nut with the stem may be removed to serve as a wrench for the nut.

PATENTED OCT 19 1971

INVENTOR
WILLIAM ALVAREZ

BY
Paul A. Weilein
ATTORNEY

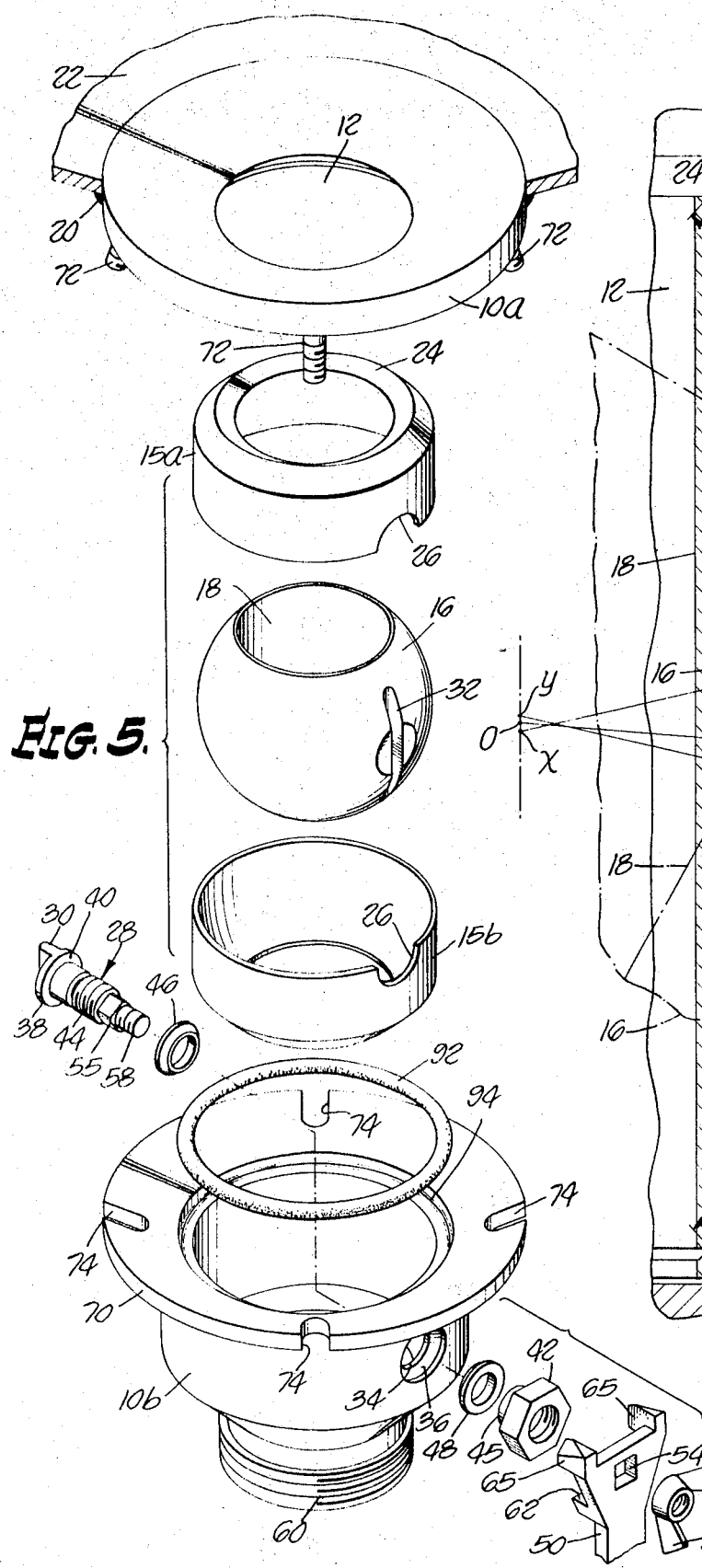

FLUSH BOTTOM TANK BALL VALVE

BACKGROUND OF THE INVENTION

Widely used conventional ball valves are acceptable for general industrial use but for a number of reasons are not satisfactory for food processing where high standards of sanitation are mandatory. One reason is that industrial use does not warrant the additional expense of fine surface finishing of valve parts which is necessary to minimize adherence of food materials and to facilitate the required frequent cleaning of the valve parts. Another reason is that economy in the manufacture of valves for general industrial use requires that valve components be usable in various valve assemblies to make possible mass production of the components and the result is that more components than necessary enter into the construction of a single valve to make it more difficult to clean the valve. Another reason is that in general use it is permissible for a valve to have sharp corners, crevices, reentrant corners, inaccessible voids and inaccessible screw threads which multiply the cost of cleaning operations and preclude the use of a valve for food processing operations. Another disadvantage of a conventional ball valve for use in the food industry is that when the ball valve is positioned at the bottom outlet of a tank or pressure vessel, more often than not a pocket is formed that precludes free flow and drainage into the valve inflow port.

For the above reasons, there is a pressing need in the food processing industry for a ball valve of simple construction that has relatively few parts, all of which have noncorrosive surface finishes of 32 or better. The ball valve should be completely free from 90° internal corners, inaccessible voids or crevices, reentrant corners and internal screw threads. In addition, all fixed pins and studs should have continuous circumferential fillets for easy cleaning and to avoid entrapment of bacteria-breeding material. Finally, the valve construction should provide smooth sloping surfaces for food materials entering the valve from a processing tank or vessel.

SUMMARY OF THE INVENTION

The valve body which is free from internal screw threads confines a plastic cage for a valve member in the form of a ball that has a diametrical passage therethrough. The cage may be made of a suitable heat-resistant low-friction plastic such as the fluorocarbon "Teflon" or the polyimide "Vespel" that is available from Du Pont. The valve body is made in two sections clamped together by wing nuts which may be easily manually loosened for separation of the sections to permit full access to the cage and ball and to permit quick and complete dismantling of the valve for cleaning purposes. The upper of the two sections of the valve body is in the form of a shallow conical tank flange for drainage into the valve and the conical drainage surface is continued in a crevice-free manner by the upper end of the ball cage which is exposed to the tank pressure. In addition, the conical tank flange of the valve body may itself be a continuation of a conical bottom wall of a tank or vessel.

The interior of the valve body is tapered at its opposite ends adjacent the respective ports and the opposite ends of the plastic cage are correspondingly tapered so that conically curved inner end surfaces of the valve body mate with corresponding conical outer end surfaces of the plastic cage. The plastic cage is placed under longitudinal compression by the wing nuts at the juncture of the valve body sections and is additionally compressed by fluid pressure acting at the inflow end of the cage to crowd the cage against the outflow end of the valve body.

By virtue of the mating tapered surfaces at the opposite ends of the valve body and cage, the endwise or longitudinal compression of the valve body results in sealing compression of the wall of the cage across its thickness at the two ends of the cage and further results in highly effective radially inward sealing pressure by the cage against the periphery of the ball in two annular end zones adjacent the two valve ports respectively.

A further feature of the invention is the concept of providing clearance between the cage and the ball in a relatively wide annular zone that separates the two annular end zones. The desired clearance in the central zone is provided by forming the inner surface of the cage to longer radii on two different centers of spherical curvature. Thus, the sealing pressure created by longitudinal compression of the cage is concentrated at the two annular end zones, the result being high unit sealing pressure in the two zones to cause the plastic cage to conform to minute irregularities in the periphery of the ball in the two annular end zones. Increased sealing effectiveness is achieved without corresponding increase in frictional resistance to rotation of the ball, since sealing effectiveness increases with increase in unit pressure but frictional resistance is not affected by changes per se in the areas of mutual contact.

In the course of the rotation of the ball between fully open position and fully closed position there is a momentary shift in the area of the cage that is subject to tank pressure with consequent momentary loss in sealing pressure at the annular end zone that is adjacent the inflow port. To compensate for this momentary loss in sealing effectiveness at this annular end zone, the invention provides a sealing ring embracing the cage between the valve body and the cage. In this regard, a feature of the invention is that the juncture between the two separable sections of the valve body is in the region where the sealing ring is required and the sealing ring serves not only to form a seal between the valve body and the cage, but also serves as a seal between the two sections of the valve body.

The plastic cage is made in two pieces for easy removal with the parting line between the two pieces concentric to the two valve ports an equidistance from the two ports. The mating edges of the two pieces of the cage are recessed to clear a radial operating stem that is releasably interlocked with the ball and that carries an arm on its exterior end to serve as a valve handle.

As will be explained, the operating stem which is insertable from the interior of the valve body has an enlargement on its inner end that cooperates with a nut on its outer end to compress a pair of plastic rings which not only provide a seal around the operating stem, but also serve as a bearing for the operating stem. In this regard, a feature of the invention is the concept of adapting the handle for releasable engagement with both the nut and the operating stem so that the handle normally serves the additional purpose of interlocking the nut with the stem to prevent loosening of the nut by operation of the valve.

A further feature is that the outer end of the handle is shaped to straddle the nut in effective engagement with a selected peripheral face of the nut. The handle is normally retained on the outer end of the operating stem by a wing nut which may be easily and quickly removed to release the handle for use of the handle as a wrench to tighten or loosen the external nut on the operating stem.

The features and advantages of the invention may be understood from the following detailed description and the accompanying drawings.

BRIEF DESCRIPTION OF THE DRAWING

In the drawings, which are to be regarded as merely illustrative:

FIG. 4 is a greatly enlarged section along the line 4—4 of FIG. 1 showing how the cage makes pressure contact with the ball at two end zones and curves away from the ball to provide clearance between the ball and the cage in the relatively wide central zone between the two end zones; and FIG. 5 is an exploded perspective view of the valve parts.

DESCRIPTION OF THE PREFERRED EMBODIMENT OF THE INVENTION

Figure 1:
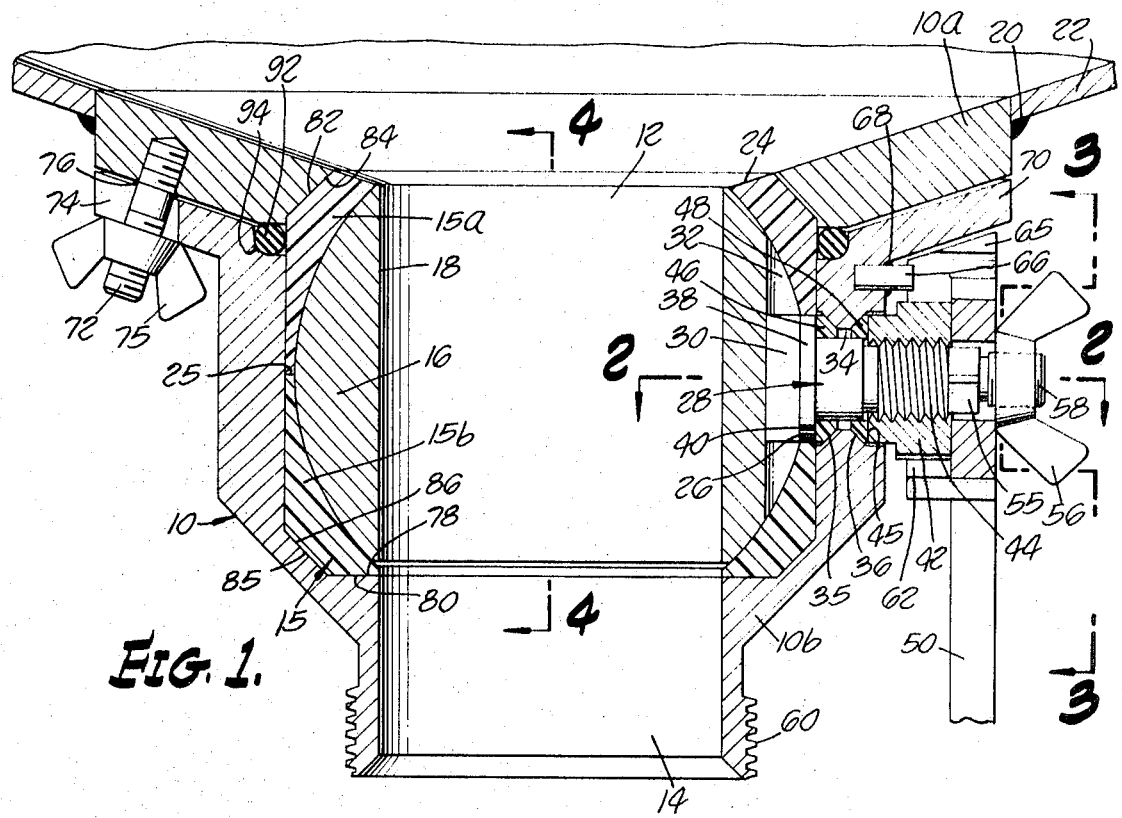
FIG. 1 is a longitudinal sectional view of the presently preferred embodiment of the ball valve.

Referring to FIG. 1, the essential parts of the initial embodiment of the invention include a valve body generally designated 10 having an inflow port 12 and a coaxial outflow port 14. The valve body confines a plastic cage 15 that journals a valve member in the form of a ball 16, the ball having a diametrical flow passage 18 therethrough. The valve body 10 is made in two separate sections 10a and 10b, the upper valve body section 10a being in the form of a tank flange which is intended to be attached by welding 20 to the bottom wall 22 of a tank or receptacle at a bottom opening therein.

It is contemplated that the bottom wall 22 of the tank or receptacle will be of the configuration of a shallow cone and that the tank flange 10 will be of similar configuration to continue the slope of the bottom wall towards the inflow port 12. It is further contemplated that the upper end 24 of the cage 15 will be exposed to the interior of the tank or vessel around the inflow port 12 and will continue the slope towards the inflow port, the upper end of the cage being flush both with the tank flange 10a and with the rim of the inflow port 12.

Figure 2:
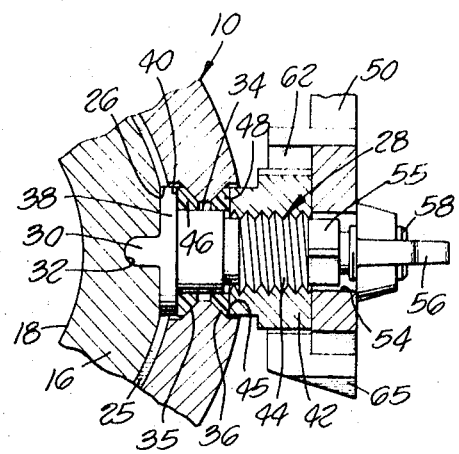
FIG. 2 is a fragmentary section taken along the line 2—2 of FIG. 1.

The cage 15 is made in two separate sections 15a and 15b which meet at a circumferential parting line 25 with the mating edges of the two sections formed with circular notches 26 (FIG. 5) to straddle a radial operating stem 28 that releasably engages the ball 16. In the construction shown, the operating stem 28 has a diametrical rib 30 (FIG. 2) on its inner end which normally seats in a complementary longitudinal groove 32 in the periphery of the ball.

The operating stem 28 extends through a radial opening 34 in the valve body that is larger in diameter than the operating stem and this opening is bevelled in both axial directions to form an inwardly facing conical shoulder 35 and a similar outwardly facing conical shoulder 36. The inner end of the operating stem 28 is formed with a radial flange 38 which is peripherally confined by the plastic cage 15 and this flange forms a radial shoulder 40 which confronts the annular shoulder 35. An external hexagonal nut 42 in engagement with a screw thread 44 on the operating stem provides an inwardly facing radial shoulder 45 which confronts the outwardly facing conical shoulder 36.

A plastic sealing ring 46, which may be of the same material as the cage 15, embraces the operating stem 28 between the two shoulders 35 and 40 and a second similar sealing ring 48 embraces the operating stem between the two shoulders 36 and 45. It is apparent that the nut 42 may be tightened on the operating stem to cooperate with the flange 38 of the operating stem to place the two sealing rings 46, 48 under effective sealing pressure. In this regard, a feature of the invention is that the two plastic sealing rings 46 and 48 not only serve their primary sealing purpose, but also serve as a low friction bearing for the operating stem.

Figure 3:
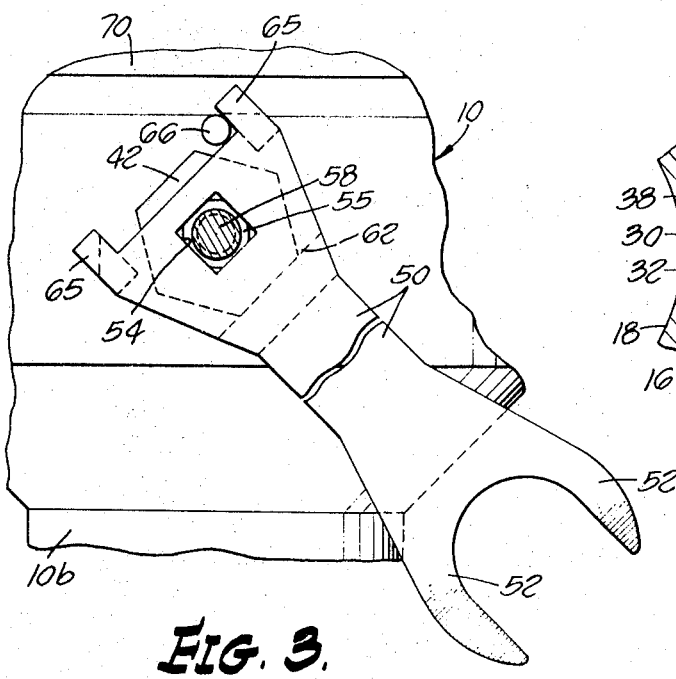
FIG. 3 is a fragmentary side elevational view of the valve as seen along the line 3—3 of FIG. 1 showing how the valve handle is shaped to serve as a wrench for turning the exterior nut on the valve stem.

Any suitable means may be provided to actuate the operating stem 28 either directly or by remote control. In the construction shown, a handle 50 is removably mounted on the outer end of the operating stem and as shown in FIG. 3 the outer end of the handle is in the form of an open end wrench. Thus, the handle has two parallel extensions 52 dimensioned to straddle the nut 42 in effective engagement with opposite peripheral faces of the nut in a well known manner. The inner end of the handle 50 is formed with a square aperture 54 to fit over a portion 55 of the operating stem that is of similar square cross section and the handle is releasably secured by a wingnut 56 that screws onto the threaded outer end 58 of the operating stem in abutment with the outer face of the handle 50.

It is to be noted that the screw threads on the operating stem 28 are outside of the valve body with no possibility of contact of the screw threads with the food material that flows through the valve body. The valve body at the outflow port 14 is formed with a screw thread 60, but this screw thread is an external screw thread that is also isolated from the food material.

The handle 50 has a transverse rib 62 that lies snugly against one face of the hexagonal nut 42 to keep the nut from rotating relative to the handle. Since the handle by virtue of its square aperture 54 is releasably interlocked with the operating stem 28, it is apparent that the handle serves in effect as means to interlock the hexagonal nut 42 and the operating stem to prevent rotation of the nut relative to the operating stem. The handle 50 may be swung 90° between its open and closed positions and to limit the handle to these two alternate positions a pair of spaced stop lugs 65 on the inner end of the handle cooperate with a fixed stop pin 66 on the valve body. As indicated in FIG. 1, the stop pin 66 is surrounded by a weld 68 that forms a fillet at the juncture of the stop pin with the outer surface of the valve body to discourage the adherence of foreign matter around the stop pin.

A feature of the invention is that the valve body 10 is constructed to place the plastic cage 15 under longitudinal compression and that the valve body and cage are so shaped that the longitudinal compression of the cage results in relatively high unit sealing pressure of the cage radially inwardly against the periphery of the ball 16 in two annular end zones which are designated "A" and "B" respectively in FIG. 4. To carry out this concept the lower valve body section 10b is formed with a conical flange 70 which confronts the upper valve body section or tank flange 10a in spaced relation thereto and suitable means is provided to draw the flange 70 towards the tank flange 10a to create the desired longitudinal compression of the cage 15.

In the construction shown in the drawings, four equally circumferentially spaced threaded studs 72 extend downwardly from the tank flange 10a through corresponding peripheral slots 74 in the flange 70 and wingnuts 75 on the threaded studs bear against the undersurface of the flange 70. The threaded studs 72 are surrounded by weld fillets 76 that serve the same purpose as the weld fillet 68 around the stop pin 66. It is apparent that the four wingnuts 75 may be tightened to contract the valve body longitudinally for the purpose of placing the cage 15 under longitudinal compression.

It is important to note that if the tank or receptacle to which the valve is attached is under pressure, fluid pressure will act on the upper end 24 of the cage 15 to urge the lower end 78 of the cage against a corresponding inner annular shoulder 80 of the valve body that is perpendicular to the axis of the valve body. Thus, the effect of the fluid pressure supplements the effect of tightening of the four wingnuts 75 in placing the cage 15 under longitudinal compression.

For the purpose of converting the longitudinal compression of the cage 15 into radially inward sealing pressure against the ball 16, the interior of the upper end of the valve body 10 is formed with an annular inclined shoulder 82 that mates with a corresponding annular inclined shoulder 84 of the cage 15 and in like manner the interior of the lower end of the valve body forms an upwardly facing annular inclined shoulder 85 that mates with a corresponding annular inclined shoulder 86 of the cage 15. It is apparent that by virtue of the cooperating annular inclined shoulders 82, 84, 85, and 86, longitudinal compression of the cage creates sealing pressure in the above mentioned end zones "A" and "B," the sealing pressure being directed radially inward towards the center of curvature of the ball 16, as indicated by the arrows 88 in FIG. 4.

A feature of the preferred embodiment of the invention is the concept of providing clearance space between the periphery of the ball 16 and the surrounding cage 15 in a relatively wide central annular zone designated "C" in FIG. 4, which zone is bounded by the two annular end zones "A" and "B." This central clearance space is provided by forming the interior surface of the cage 15 with two radii of spherical curvature that are longer than the radius of spherical curvature of the periphery of the ball 16. Thus, in FIG. 4 the upper half of the interior of the cage has a greater radius of spherical curvature than the ball with the center of curvature of the cage shifted downward from the center 0 of the ball to the point designated x in FIG. 4. In like manner, the radius of spherical curvature of the lower half of the cage is longer than the radius of spherical curvature of the ball taken from a second center that is shifted upward from the center of the ball, the second center being designated y in FIG. 4. The result, as shown in FIG. 4, is that the inner surface 90 of the plastic cage 15 is offset outwardly from the periphery of the ball 16 in the central annular zone "C."

The result of providing the clearance space in the central annular zone "C" is to increase the unit pressure against the periphery of the ball in the two end zones "A" and "B." Fortuitously, the reduction in the areas of mutual contact of the ball and the cage for the purpose of achieving high unit pressure in zones "A" and "B" does not result in greater frictional resistance to manual rotation of the ball 16.

In the course of the 90° of rotation of the ball 16 from its fully open position shown in FIG. 1 to its fully closed position, the area of the cage 15 that is under the pressure of the fluid in the tank or receptacle momentarily changes because the inlet end of the flow passage 18 (FIG. 4) momentarily exposes an outer area of the cage to the fluid pressure. Consequently, the longitudinal compression of the cage by the pressurized fluid is momentarily interrupted. To avoid leakage of fluid between the shoulders 82 and 84 at these brief moments, a suitable O-ring 92 in an annular groove 94 of the valve body embraces the cage 15 to serve as a seal between the cage and the valve body.

A feature of this particular embodiment of the invention is that the O-ring 92 not only forms a seal between the valve body and the cage, but also serves as a seal between the two sections 10a and 10b of the valve body. Thus, tightening the four wing screws 75 not only serves to contract the valve body longitudinally for the purpose of compressing the cage 15, but also serves to compress the O-ring 92 for the purpose of the two sealing functions of the O-ring.

The manner in which the ball valve serves its purpose with the various previously mentioned advantages may be readily understood from the foregoing description of the ball valve structure.

An important feature of the invention is that loosening and removing the four wingnuts 75, loosening and removing the fifth wingnut 56, and loosening and removing the hexagonal nut 42 from the operating shank 28 releases all of the valve parts for separation in the manner illustrated by FIG. 5. All of the metal parts including the two sections of the valve body 45 and the ball 16 are made of a suitable corrosion-resistant metal such as stainless steel with fine surface finishes to make the parts easy to clean. As may be seen in FIG. 1, all of the parts of the valve that are exposed to the food material flowing through the valve fit snugly together at their junctures to avoid forming any internal crevices for entrapment of the food material.

My description in specific detail of the presently preferred embodiment of the invention will suggest various changes, substitutions, and other departures from my disclosure within the spirit and scope of the appended claims.

I claim:

1. In a ball valve of the character described wherein a valve body with coaxial inflow and outflow ports confines a valve member in the form of a ball with a diametrical flow passage therethrough and plastic material confined in the valve body in axial alignment with the two ports forms a cage for the ball in pressure contact therewith, the improvement to increase the sealing efficiency of the cage, comprising:

the cage being shaped and dimensioned for sealing pressure against the ball in two annular zones near the two ports respectively with clearance between the ball and the cage in a central annular zone between the two zones, thereby reducing the area of mutual pressure contact between the ball and cage with consequent increase in the unit pressure in the two zones.

2. An improvement as set forth in claim 1 which includes a sealing ring embracing the cage near the inflow port.

3. An improvement as set forth in claim 2 in which the valve body has two sections that are separable for access to the cage, the juncture between the two sections being near the inflow port with said sealing ring under compression between the two sections.

4. An improvement as set forth in claim 3 in which said sealing ring is positioned axially inward from the corresponding one of said two zones.

5. An improvement as set forth in claim 3 in which one of the body sections is in the form of a tank flange.

6. An improvement as set forth in claim 5 in which the tank flange slopes toward the inflow port for drainage into the valve.

7. An improvement as set forth in claim 6 in which one end of said cage continues the slope of the tank flange to the inflow port.

8. An improvement as set forth in claim 1 in which said cage and valve body have radial openings in register with each other in said central zone;

in which an operating stem for the ball separate from the ball extends through the radial openings;

in which the ball has a peripheral groove in said central zone;

and in which said operating stem is shaped at its inner end to seat in said groove for imparting rotation to the ball.

9. An improvement as set forth in claim 8 in which the radial opening in the valve body has an inside diameter larger than the corresponding portion of the operating stem;

and in which two axially spaced sealing rings are confined in the radial opening of the valve body and serve as a bearing for the operating stem.

10. An improvement as set forth in claim 1 in which the inner surface of the cage is spherically curved in said two zones with substantially the same radius of curvature as the periphery of the ball;

and in which the inner surface of the cage in said central zone has two radii of spherical curvature longer than the radius of spherical curvature of the periphery of the ball to provide said clearance, the longer radius of spherical curvature of the upper half of the cage being about a center below the center of the ball and the longer radius of spherical curvature of the lower half of the cage being about a center above the center of the ball.

11. An improvement as set forth in claim 1 in which the exterior of said cage is tapered with conically curved surfaces at its two ends in the region of said two zones;

in which the interior of the valve body has correspondingly tapered conical surfaces mating with the conical surfaces of the cage;

and in which the valve body holds the cage under axial compression with the consequent creation of pressure at the mating conical surfaces directed inwardly towards the ball at the two zones.

12. An improvement as set forth in claim 11 in which the valve body has two sections that are separable for access to the cage;

in which the juncture between the two sections encompasses the cage between the two ports of the valve body;

and in which screw means acting between the two sections at said juncture is effective to create axial compression of the cage.

13. An improvement as set forth in claim 12 in which annular sealing means embraces the cage at said juncture and not only seals said juncture but also forms a seal between the valve body and the cage.

14. An improvement as set forth in claim 12 in which said screw means comprises spaced studs fixedly mounted on one of the valve body sections and wingnuts on the studs in abutment with the other body section.

15. In a ball valve of the character described wherein a valve body with coaxial inflow and outflow ports confines a valve member in the form of a ball with a diametrical flow passage therethrough and plastic material confined in the valve body in axial alignment with the two ports forms a cage for the ball in pressure contact therewith, the improvement comprising:
the exterior of the cage being tapered with annular inclined surfaces at its two opposite ends,
in which the interior of the valve body has corresponding annular inclined surfaces mating with the annular inclined surfaces of the cage;
and in which the valve body holds the cage under axial compression with the consequent creation of pressure at the mating annular inclined surfaces directed inwardly against the ball.

16. An improvement as set forth in claim 15 which includes a sealing ring embracing the cage between the two ports under compression between the cage and the surrounding valve body.

17. An improvement as set forth in claim 15 in which the valve body has two sections that are separable for access to the cage,
the juncture between the two sections encompassing the cage between said two ports;
and in which a sealing ring embraces the cage at said juncture with the sealing ring under sealing pressure by the two sections and the cage.

18. An improvement as set forth in claim 17 in which screw means acting between the two sections at said juncture is effective to create axial compression of the cage as well as to create sealing pressure between the sealing ring and the cage and between the sealing ring and the valve body.

19. In a ball valve of the character described wherein a valve body with coaxial inflow and outflow ports confines a valve member in the form of a ball with a diametrical flow passage therethrough and plastic material confined in the valve body in axial alignment with the two ports forms a cage for the ball in pressure contact therewith, and wherein an operating stem for the ball extends radially therefrom through a radial opening in the cage and through a corresponding radial opening in the valve body, the improvement comprising:
said operating stem being separate from the ball and releasably interlocked with the ball;
said operating stem being insertable in the radial opening of the valve body from the interior of the valve body;
said operating stem having an enlargement inside the valve body forming an outwardly facing circumferential shoulder;
said valve body having an inner annular shoulder confronting said circumferential shoulder of the valve stem;
nut means in screw-threaded engagement with the operating stem and acting between the valve body and the operating stem to urge the operating stem axially outward thereby axially compressing the sealing means between the two confronting shoulders;
and means releasably engaging the operating stem for rotation therewith, said releasable engaging means engaging the nut means to interlock the nut means with the stem for rotation therewith to prevent loosening of the nut means relative to the operating stem.

20. An improvement as set forth in claim 19 in which the radial opening in the valve body is dimensioned to provide radial clearance around the operating stem and in which said sealing means embraces the operating stem to function as a bearing therefor.

21. An improvement as set forth in claim 20 in which said annular sealing means is tapered and said inner annular shoulder is correspondingly tapered for radial contraction of the annular sealing means against the operating stem in response to the axial compression of the annular sealing means.

22. An improvement as set forth in claim 19 in which the valve body has an outer annular shoulder around its radial opening;
and in which a second outer annular sealing means embraces the operating stem under compression between said outer shoulder and the nut means.

23. An improvement as set forth in claim 22 in which said outer annular shoulder is tapered and said outer annular sealing means is correspondingly tapered for radial contraction of the outer annular sealing means against the operating stem in response to the axial compression of the outer annular sealing means.

24. An improvement as set forth in claim 19 in which said releasably engaging means is a handle for manual rotation of the operating stem.

25. An improvement as set forth in claim 24 in which said handle has a portion normally spaced radially from the nut means shaped and dimensioned to straddle the nut means to permit the handle to serve as a wrench for tightening or loosening the nut means when the handle is removed from the operating stem.

26. An improvement as set forth in claim 19 in which said nut means is of hexagonal configuration with six peripheral faces and said releasable engaging means has a lateral projection to abut said faces selectively to interlock the nut means and the operating stem.

27. In a ball valve of the character described wherein a valve body with coaxial inflow and outflow ports confines a valve member in the form of a ball with a diametrical flow passage therethrough and plastic material confined in the valve body in axial alignment with the two ports forms a cage for the ball in pressure contact therewith, the improvement to increase the sealing efficiency of the cage, comprising:
said cage having two opposite end faces, one of said end faces abutting the inner surface of the valve body in the region of the outflow port,
the opposite end face of the cage being exposed around said inflow port whereby with the inflow port connected to a source of fluid, the pressure of the fluid against said one end face of the cage axially compresses the cage to create sealing pressure between the cage and the ball.

28. An improvement as set forth in claim 27 in which the exterior of the cage is tapered with annular inclined surfaces at its two ends;
in which the interior of the valve body has corresponding annular inclined surfaces mating with the annular inclined surfaces of the cage;
and in which the valve body holds the cage under axial compression with consequent creation of pressure at the mating annular inclined surfaces directed inwardly towards the ball.

29. An improvement as set forth in claim 28 in which the valve body has two sections that are separable for access to the cage;
in which the juncture between the two sections encompasses the cage between the two ports of the valve body;
and in which screw means acting between the two sections at said juncture is effective to create axial compression of the cage.

30. An improvement as set forth in claim 29 in which said screw means comprises spaced fixed studs on one of the valve body sections and wingnuts on the studs in abutment with the other body section.

31. A combination as set forth in claim 29 in which annular sealing means embraces the cage at said juncture and not only seals said juncture but also forms a seal between the valve body and the cage.